United States Patent [19]
Pradel

[11] Patent Number: 5,950,996
[45] Date of Patent: Sep. 14, 1999

[54] SHOCK-ABSORBING STRUT FOR A MOTOR VEHICLE

[75] Inventor: Robert Pradel, Heidenfeld, Germany

[73] Assignee: Fitchel & Sachs AG, Schweinfurt, Germany

[21] Appl. No.: 08/797,583

[22] Filed: Feb. 7, 1997

[30] Foreign Application Priority Data

Feb. 8, 1996 [DE] Germany .......................... 196 04 558

[51] Int. Cl.⁶ ........................... B60G 11/56; B60G 13/00
[52] U.S. Cl. .............................................. 267/221; 267/34
[58] Field of Search ............................... 267/33–35, 221; 188/315, 318, 322.12

[56] References Cited

U.S. PATENT DOCUMENTS

| | | | |
|---|---|---|---|
| 4,042,259 | 8/1977 | Fiedler et al. | 267/221 |
| 4,089,511 | 5/1978 | Palmer | 267/221 |
| 4,828,231 | 5/1989 | Fukumura et al. | 188/318 |
| 4,890,822 | 1/1990 | Ezure et al. | 188/318 |
| 5,238,092 | 8/1993 | Huang et al. | 188/299 |
| 5,402,868 | 4/1995 | Handke et al. | 188/322.12 |
| 5,810,335 | 9/1998 | Wirtz et al. | 267/221 |
| 5,823,517 | 10/1998 | Huang | 267/221 |

FOREIGN PATENT DOCUMENTS

| | | |
|---|---|---|
| 0433700 | 6/1991 | European Pat. Off. . |
| 4231641 | 3/1994 | Germany . |
| 4420134 | 10/1995 | Germany . |

*Primary Examiner*—Christopher P. Schwartz

[57] ABSTRACT

A piston-cylinder unit includes a cylinder in which a piston rod is located so that the piston rod can move axially. A first connection mechanism is connected to the cylinder, and a second connection mechanism is connected to the piston rod. A positioning cylinder, with a pressure medium connection, is effectively connected to one of the first and second connection mechanisms. The distance between the first and second connection mechanisms can be set by the addition or discharge of pressure medium to or from the positioning cylinder. The positioning cylinder is located in series with the cylinder, and the piston rod forms a guide path or track for the positioning cylinder.

6 Claims, 8 Drawing Sheets

SHOCK-ABSORBING STRUT FOR A MOTOR VEHICLE

BACKGROUND OF THE INVENTION

1. Field of the Invention

The present invention relates generally to a piston-cylinder unit such as for a shock absorbing strut, or vibration damping strut, of a motor vehicle. The piston-cylinder unit can include a cylinder in which a piston rod can be located. The piston rod can move axially with respect to the cylinder. The piston rod can be connected to a first connection mechanism, and the cylinder can be connected to a second connection mechanism. A positioning cylinder can be connected to one of the first and second connection mechanisms. The distance between the first and second connection mechanisms can be set by the addition or discharge of pressure medium via a pressure medium connection to the positioning cylinder.

2. Background Information

A known piston-cylinder unit is described in German Laid Open Patent Application No. 42 31 641 (corresponding to U.S. Pat. No. 5,401,053). In this type of piston-cylinder unit, the distance between the connection mechanisms is controlled by the feed and discharge of pressure medium to maintain a defined level position. One disadvantage of the piston-cylinder unit constructed according to the teaching of German Laid Open Patent Application No. 42 31 641 is that the cylinder, by means of its inside diameter, forms a running path or track for the piston of the piston rod. Furthermore, the outside diameter represents a running path for the positioning cylinder.

If one were to take a cross section through the piston-cylinder unit in the vicinity of the piston, it would be apparent that the cylinder is a component of a double fit between the piston and the positioning cylinder. The inside diameter must be precisely fabricated as a running path for the piston, and a corresponding precision is required for the outside diameter. For example, the inside diameter can be calibrated or finished to size by a refinishing of the inside or outside diameter. Consequently, under some conditions, it may not be possible to refinish the outside diameter to the desired size, because it would thereby change the inside diameter.

OBJECT OF THE INVENTION

The object of the present invention is to realize a piston-cylinder unit in which the known calibration problems are solved.

SUMMARY OF THE INVENTION

The present invention teaches that this object can be achieved by locating the positioning cylinder in series with the cylinder, whereby the piston rod can represent a guide path for the positioning cylinder. The undesirable double fits can be separated, whereby the precision-machined piston rod, which should be precision-machined in any case, can be used as a guide path for the positioning cylinder.

The present invention also teaches that the positioning cylinder can be closed on the end in relation to the piston rod by a guide-seal unit. To reduce costs, this guide-seal unit can be essentially identical to the guide-seal unit of the cylinder.

In one advantageous embodiment, the positioning cylinder can include two individual cylinders which are preferably located concentrically and move in a telescoping manner in relation to one another. Between the two individual cylinders there can be a second guide-seal unit, so that the outside diameter of the one individual cylinder can represent a running path for the other individual cylinder.

Further, the positioning cylinder in a possible embodiment of the present invention can have fastening means on one of the individual cylinders so that a first expansion bellows can be installed between the first individual cylinder and the second individual cylinder. The expansion bellows preferably covers at least the stroke length of the first individual cylinder, which first individual cylinder can project out of the second individual cylinder. The essentially inevitable dirt or other environmental contaminates cannot substantially adversely affect or damage the guidance between the two individual cylinders.

Likewise, the present invention teaches that there can be an intermediate length of the piston rod between the cylinder and the positioning cylinder, which intermediate length is preferably covered by a second expansion bellows.

The present invention also teaches that the fastening means can be realized in the form of an encircling edge, by means of which encircling edge there can be a flow connection between the spaces enclosed by the two expansion bellows. The fastening means can perform an additional function, in that the fastening means can preferably be realized in the form of a first spring plate. On the first spring plate a support spring can be supported, which support spring is preferably biased opposite or on the opposite side by a second spring plate. The second spring plate can be effectively connected to the cylinder. To eliminate the need for additional fastening means, the second spring or expansion bellows can be clamped between the first and second spring plates.

The second spring plate can advantageously have a ventilation opening for the spaces enclosed by the expansion bellows. It is therefore almost impossible and/or extremely difficult for dirt to penetrate into the space enclosed by the first expansion bellows.

To eliminate the need for fastening means, the first and second expansion bellows can be fixed in position by the support spring on the first spring plate. In addition to the positive or interlocking connection by the spring plate, a biasing force can also be applied by the support spring.

In one embodiment, the first and the second expansion bellows are preferably combined into one expansion bellows. In practical terms, the first and the second expansion bellows can, in a possible embodiment of the present invention, be formed by a single hose.

A requirement which is encountered with increasing frequency is that a piston-cylinder unit must typically have a compression stop. This requirement can be relatively easily met by realizing at least one of the expansion bellows in the preferable form of a compression stop.

In addition, the second expansion bellows, between its end points, can have an effective connection to the piston rod. As a result of the effective connection, the second expansion bellows can preferably include two segments, the respective lengths of which two segments can be changed substantially independently. Without this measure, the second expansion bellows would essentially always have to execute the deflection movement and the level control movement of the positioning cylinder. That could result in a relatively large change in length.

Under certain conditions, it can be possible that the long second expansion bellows can come into contact with the piston rod. As a result of the division of the second expansion bellows by means of a disc or plate between the expansion bellows and the piston rod, the second expansion bellows can be held at a defined distance from the piston rod. Moreover, only the expansion bellows segment, which expansion bellows segment can be directed toward, points to, or be closer to, the cylinder, can be required to execute a deflection movement.

Likewise, the second individual cylinder can be realized in a stepped or graduated fashion toward the cylinder. The cavity thus formed can be used to house a compression stop.

Independent of the features described above, there can be a decompression stop limit spring in the cylinder. The application point of the decompression stop limit spring can also be held at the desired level by means of the positioning cylinder.

The above discussed embodiments of the present invention will be described further hereinbelow with reference to the accompanying figures.

BRIEF DESCRIPTION OF THE DRAWINGS

The present invention is explained in greater detail below with reference to the embodiments illustrated in the accompanying drawings, in which.

DESCRIPTION OF THE PREFERRED EMBODIMENTS

Figure 1:
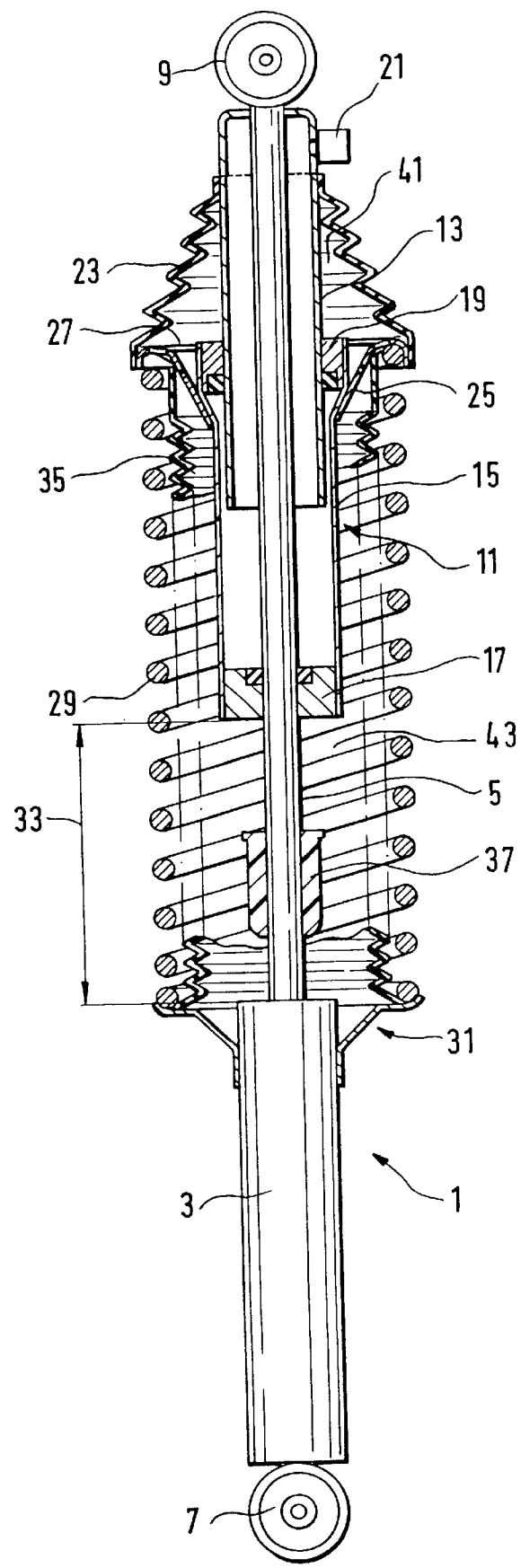
FIG. 1 shows a simplified overall view of a piston-cylinder unit.

FIG. 1 illustrates a piston-cylinder unit 1 in a simplified overall view. Essentially, the piston-cylinder unit 1 can include a cylinder 3, in which a piston rod 5 can be located so that the piston rod 5 can move axially. Fastened to the lower end of the piston-cylinder unit 1 can be a first connection mechanism 7. The construction of the connection mechanism 7 is not limited to an eye, but can also be in any embodiment with which a technician skilled in the art may be familiar.

Fastened to the portion of the piston rod 5 which projects out of the cylinder 3 can be a second connection mechanism 9. The two connection mechanisms (i.e., the first connection mechanism 7 and the second connection mechanism 9) of the piston-cylinder unit 1 can be used for fastening to a motor vehicle chassis (not shown).

In other words, the piston-cylinder unit 1 can include the first connection mechanism 7 for connecting to a first member (not shown), and the second connection mechanism 9 for connecting to a second member (not shown), the first and second members preferably being parts of a motor vehicle chassis (not shown).

Connected preferably in series downstream of the cylinder 3 can be a positioning cylinder 11. The positioning cylinder 11 itself can include a first individual cylinder 13 and a second individual cylinder 15. The first individual cylinder 13 and the second individual cylinder 15 can be concentric to one another and can move in a telescoping manner.

In other words, the piston-cylinder unit 1 can include the positioning cylinder 11, realized preferably as a fluid spring. The positioning cylinder 11 can also include a positioning actuator, realized preferably as the first individual cylinder 13 and the second individual cylinder 15. In the embodiment shown in FIG. 1, the first individual cylinder 13 can extend into the second positioning cylinder 15 to preferably permit axial telescoping of the first and second individual cylinders 13 and 15 with respect to one another. It should be realized that in other possible embodiments of the present invention, the first individual cylinder 13 can be realized as the outer telescoping cylinder, and the second individual cylinder 15 can be realized as the inner telescoping cylinder of the positioning actuator or the positioning cylinder 11.

The positioning cylinder 11 or the second individual cylinder 15 can be closed on the end by a guide-seal unit 17. This guide-seal unit 17 can thereby use the piston rod 5 as a guide path for the positioning cylinder 11.

The outside diameter of the guide-seal unit 17 can also create a seal, whereby the guide-seal unit 17 can be stationary with respect to the second positioning or individual cylinder 15. The outside diameter of the second positioning or individual cylinder 15 preferably does not serve as a guide path for an additional component, which can mean that the calibration of the guide-seal unit 17 essentially does not present any problem.

Connected to the second individual cylinder 15 can be a second guide-seal unit 19 which can center the first individual cylinder 13 of the positioning cylinder 11, also preferably creating a seal. On the first individual cylinder 13 there can be a pressure medium connection 21. The pressure medium connection 21 can itself be realized in a known manner, and by means of which pressure medium can be supplied or discharged in any desired manner, e.g. for possible embodiments of the present invention, oil and/or air. The positioning cylinder 11 can be effectively connected to the second connection mechanism 9 so that by supplying and discharging pressure medium, the distance between the two connection mechanisms (i.e. the first connection mechanism 7 and the second connection mechanism 9) can be changed, to achieve the desired level position of a motor vehicle.

For protection against the penetration of dirt, the adjustment cylinder 11 can include a first expansion bellows 23, which first expansion bellows 23 preferably covers the stroke length of the individual cylinders (the first individual cylinder 13 and the second individual cylinder 15) in relation to one another. To fix the first expansion bellows 23 in position on the positioning cylinder 11, there can be an encircling edge 25 which encircling edge 25 can be preferably realized in the form of a fastening means. The first expansion bellows 23 can be turned up over the encircling edge 25 and thus can form part of a positive or interlocking connection.

The function of the encircling edge 25 can be expanded so that the encircling edge 25 can be used as a first spring plate 27 for a support spring 29. The support spring 29 can be supported on a second spring plate 31 of the cylinder 3. The support spring 29 can thereby support the vehicle, and in possible alternative embodiments of the present invention, can support the vehicle in combination with an additional spring (not shown) or also as an individual spring. An intermediate length 33 of the piston rod 5 between the cylinder 3 and the positioning cylinder 11 can be covered by a second expansion bellows 35.

Depending on the tuning of the chassis, a compression stop 37 can be used.

In normal operation, the piston rod 5 and the cylinder 3 can move relative to one another. Relatively frequently in possible embodiments of the present invention, these two components, the piston rod 5 and the cylinder 3, can be components of a vibration damper, so that the piston-cylinder unit 1 can be considered a shock absorbing strut. When a load is applied, the support spring 29 can be compressed to a greater extent by the first spring plate 27 of the positioning cylinder 11, as a result of which the vehicle could sink.

This effect can be counteracted by filling the positioning cylinder 11 with pressure medium. The two individual cylinders, the first individual cylinder 13 and the second individual cylinder 15, can move apart from one another in the axial direction, as a result of which the distance between the two connecting mechanisms (the first connecting mechanism 7 and the second connecting mechanism 9) can once again be corrected to the specified dimension. The second spring plate 31, however, is preferably not displaced, so that there remains an elevated spring bias of the support spring 29. In the event of relatively severe spring movements as a result of increased loading, an appropriate support spring force can be available, so that contact between the wheel and the road can practically be guaranteed.

In other words, the piston-cylinder unit 1 can include a fluid spring 11 filled with pressure medium, and the fluid spring 11 can include a positioning actuator to regulate the distance between the first and second connection mechanisms 7 and 9, the positioning actuator preferably being realized as the first positioning cylinder or first individual cylinder 13 and the second positioning cylinder, or second individual cylinder 15.

If the load is reduced, the volume of the positioning cylinder 11 can also be reduced. Consequently, the bias of the support spring 29 can be reduced by a corresponding axial movement of the first spring plate 27 toward the first connection mechanism 9.

Figure 2:
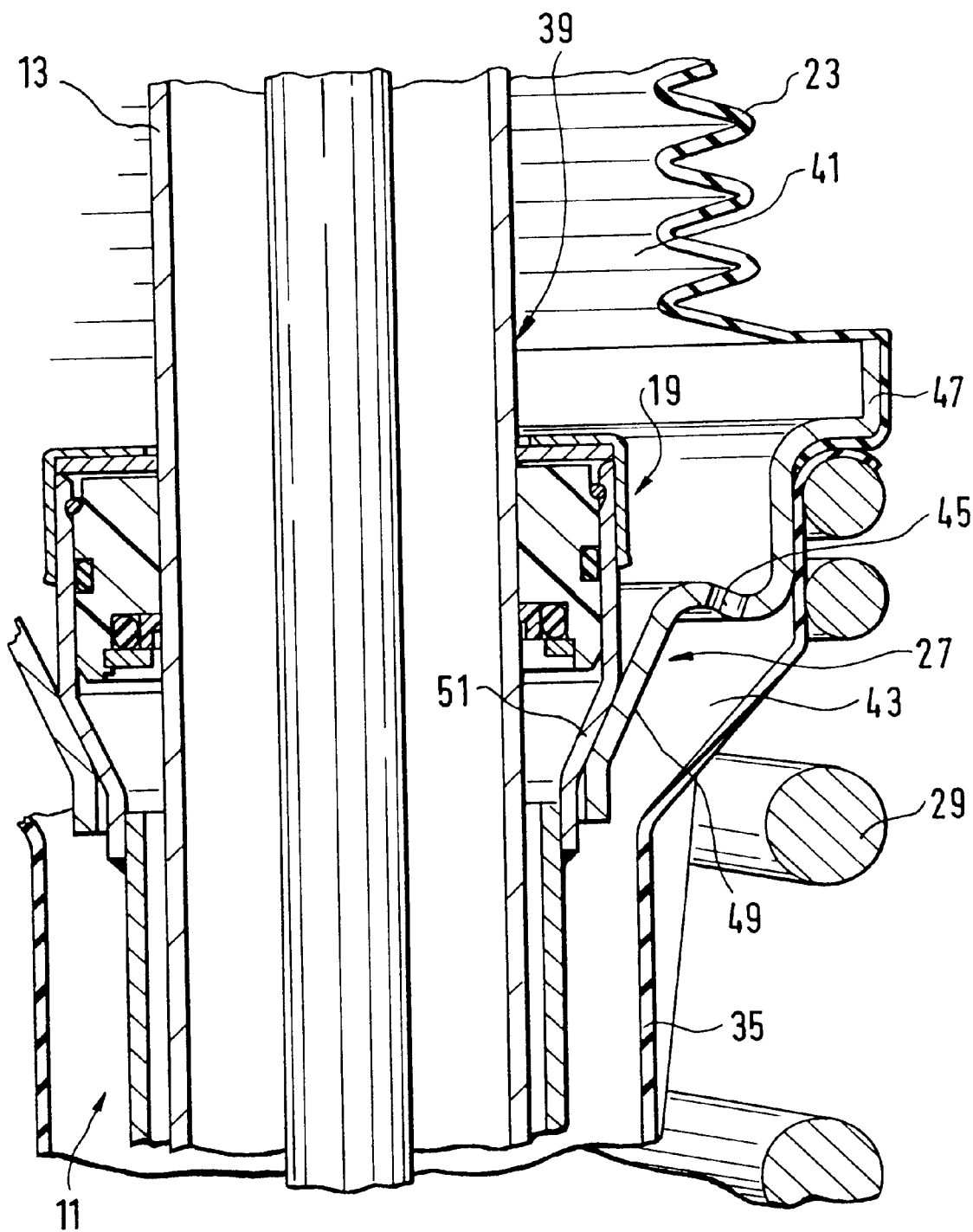
FIGS. 2, 3, 3a, 4 and 5 illustrate details of a piston-cylinder unit as shown in FIG. 1.

FIG. 2 shows a detail of the piston-cylinder unit 1 illustrated in FIG. 1, in the vicinity of the second guide-seal unit 19. The construction of the guide-seal unit 19 can be similar to that of a known single-tube vibration damper, and therefore this component (the guide-seal unit 19) need not be described in any further detail. This illustration also shows that the outside diameter of the first individual cylinder 13 preferably represents a guide path, although no calibration or finishing operations for an additional guide path need be performed for the inside diameter (of the cylinder 13).

FIG. 1 shows the first expansion bellows 23 and the second expansion bellows 35 in their fully-expanded positions. With the positioning cylinder 11 and the piston rod 5, in particular with the intermediate length 33, the first expansion bellows 23 and the second expansion bellows 35 thereby preferably form a first space 41 and a second space 43. The first space 41 and the second space 43, as shown in FIG. 2, can be connected by means of a flow connection 45 in the first spring plate 27, so that in the event of a positioning or adjustment movement of the positioning cylinder 11, there can be a compensation of the volume of the two spaces (the first space 41 and the second space 43). It should be noted that the first expansion bellows 23 and the second expansion bellows 35 can be held positively by the first spring plate 27 and non-positively by the support spring 29. The first expansion bellows 23 can be lightly contacted by an edge 47, which edge 47 can be part of the spring plate 27.

In addition the first spring plate 27 can have a conical extension 49, which conical extension 49 can be supported on a correspondingly shaped matching cone 51 of the positioning cylinder 11 or of the second individual cylinder 13. As a result of this arrangement, the first spring plate 27 can be automatically centered on the positioning cylinder 11.

Figure 3:
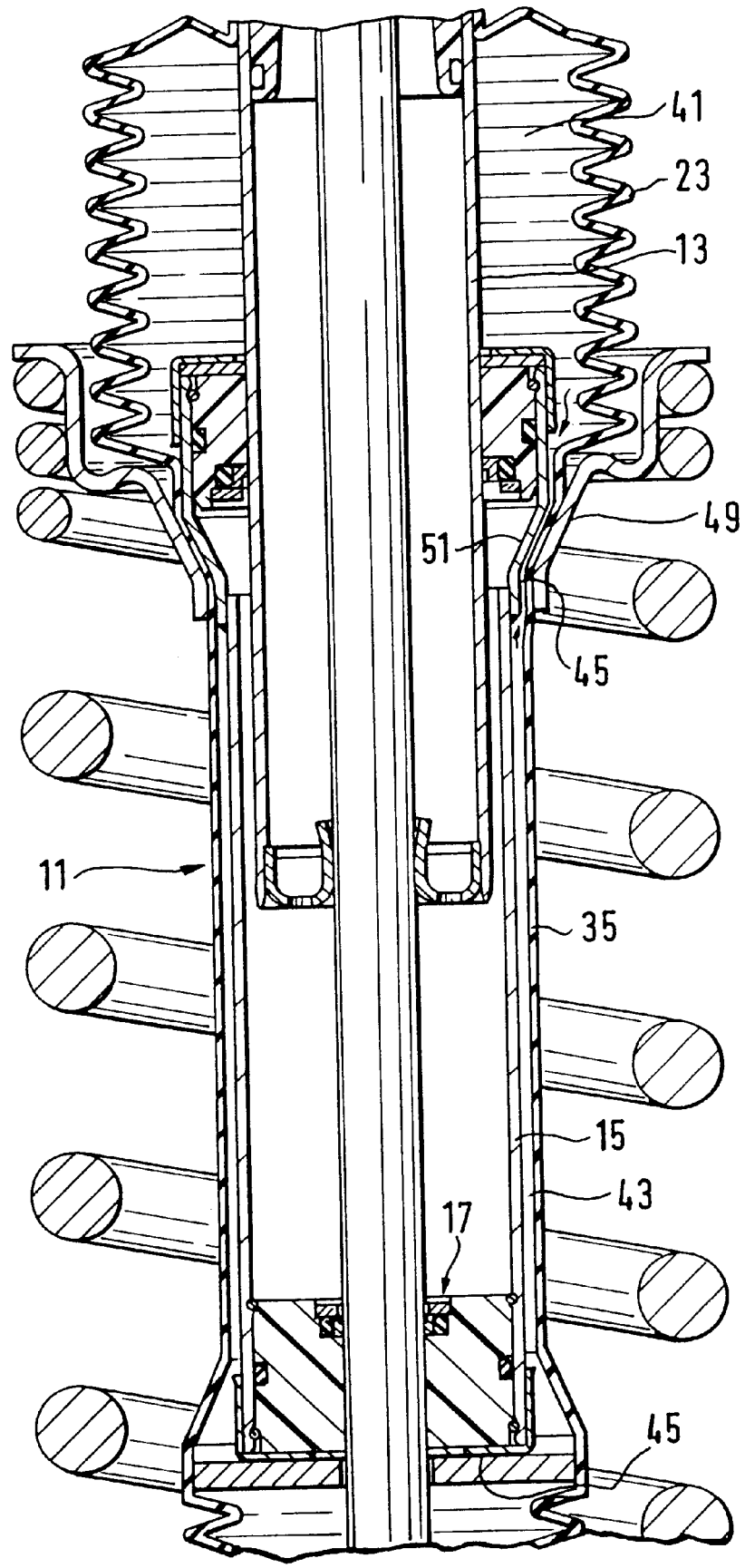
Figure 3A:
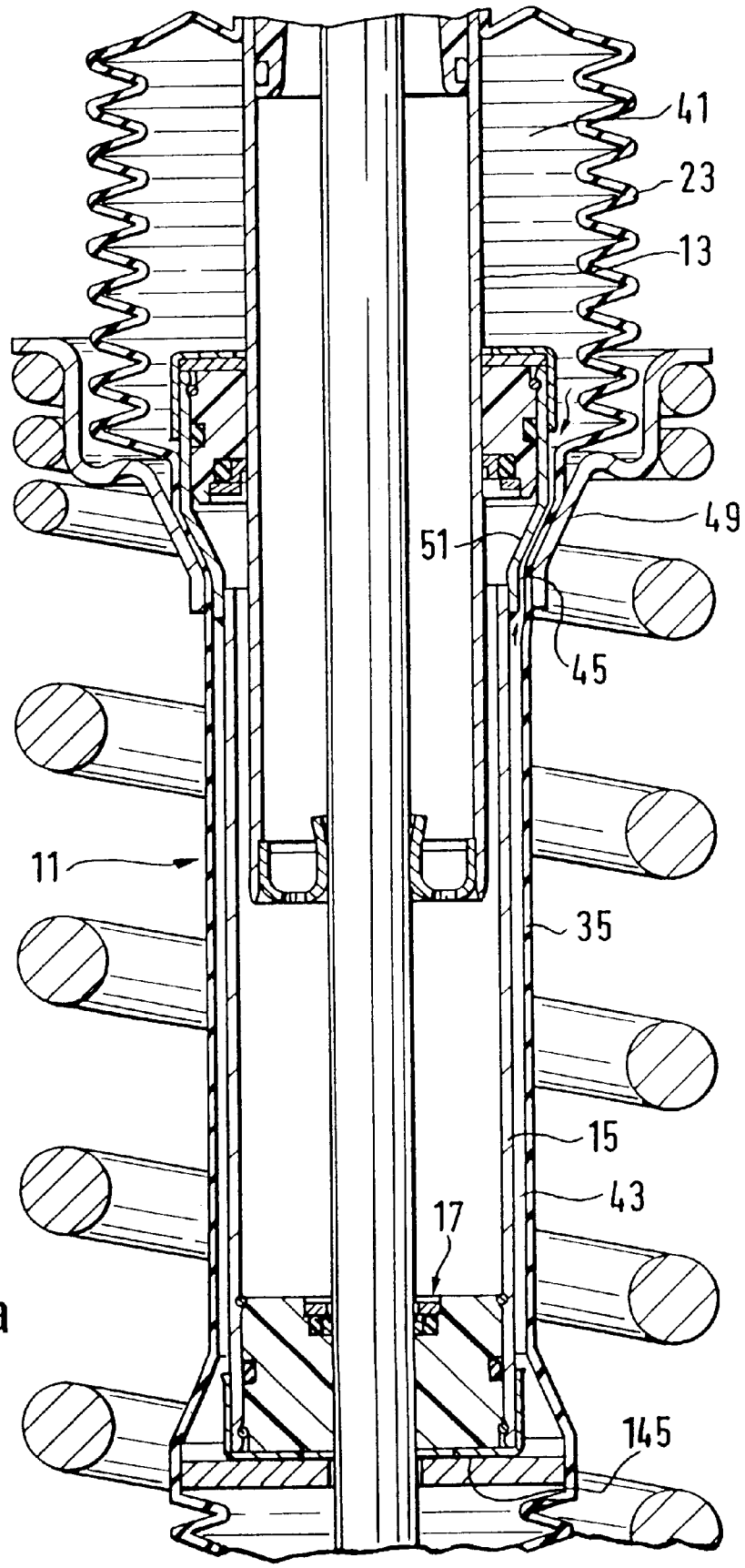

FIG. 3 is also limited to illustrating a detail, namely the area preferably between the first expansion bellows 23 and the second expansion bellows 35. In this variant embodiment, the two expansion bellows, the first expansion bellows 23 and the second expansion bellows 35, can be combined into a one-piece expansion bellows. In this design or possible embodiment of the present invention, there can be a change in the flow connection 45 between the two spaces (the first space 41 and the second space 43). Inside the matching cone 51 or the conical extension 49, there can be a bead which represents the actual flow connection 45. The flow connection 45 can continue below the first guide-seal unit 17, and in one possible embodiment, via the flow connection 145 (see FIG. 3a) that permits communication between the first expansion bellows 23 and the second expansion bellows 35.

Figure 4:
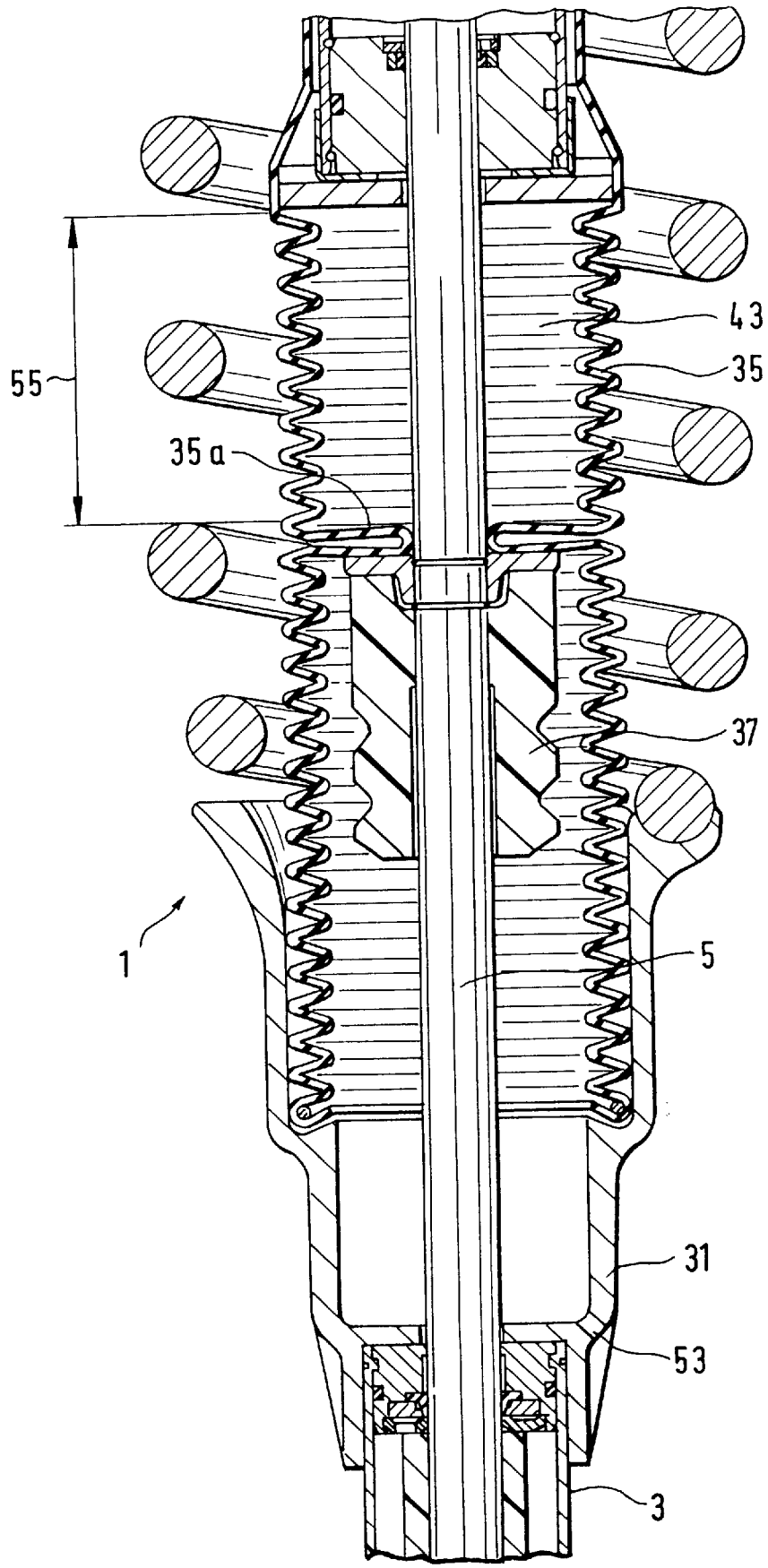

FIG. 4 shows the lower end of the second expansion bellows 35 down to the cylinder 3. The two spaces (the first space 41 and the second space 43) can have a ventilation opening 53, which ventilation opening 53 can form a connection to the environment, so that there essentially can be no substantial radial expansions or substantial contractions of the first expansion bellows 23 and the second expansion bellows 35 (See FIG. 1). In particular in the expansion bellows 23, the labyrinth action of the flow connection between the spaces 41 and 43 can essentially prevent dirt from penetrating. One special feature of the expansion bellows 35 is that the expansion bellows 35 can have a relatively more pronounced or deeper crease 35a, which crease 35a can be supported on the reverse side of the compression stop 37. As a result, a longitudinal segment 55 of the expansion bellows 35 can preferably act as an additional compression stop.

Figure 5:
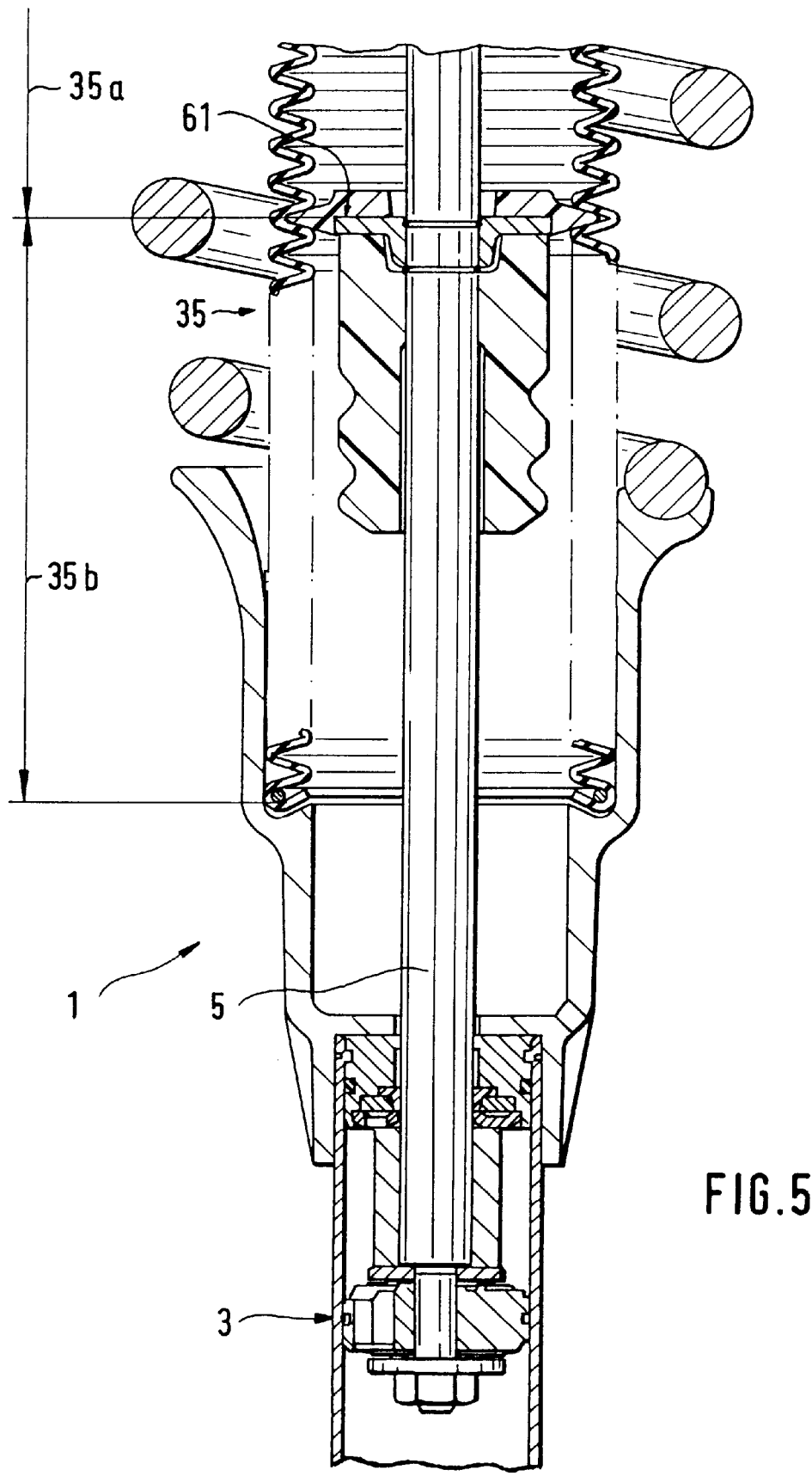

FIG. 5 shows a preferably central section of the piston-cylinder unit 1 with the lower end of the second expansion bellows 35. As shown schematically in FIG. 1, the second expansion bellows 35 can extend over a significant length of the unit 1. The second expansion bellows 35 can be effectively connected to the piston rod 5 by means of a disc 61. Consequently, the second expansion bellows 35 can be divided into a first expansion bellows length segment 35a and a second expansion bellows length segment 35b. Preferably only the expansion bellows length segment 35b executes a deflection movement with the piston rod 5 in relation to the cylinder 3. The movement of the first expansion bellows length segment 35a can be restricted to the level control movement of the positioning cylinder 11 (See FIG. 1).

Figure 6:
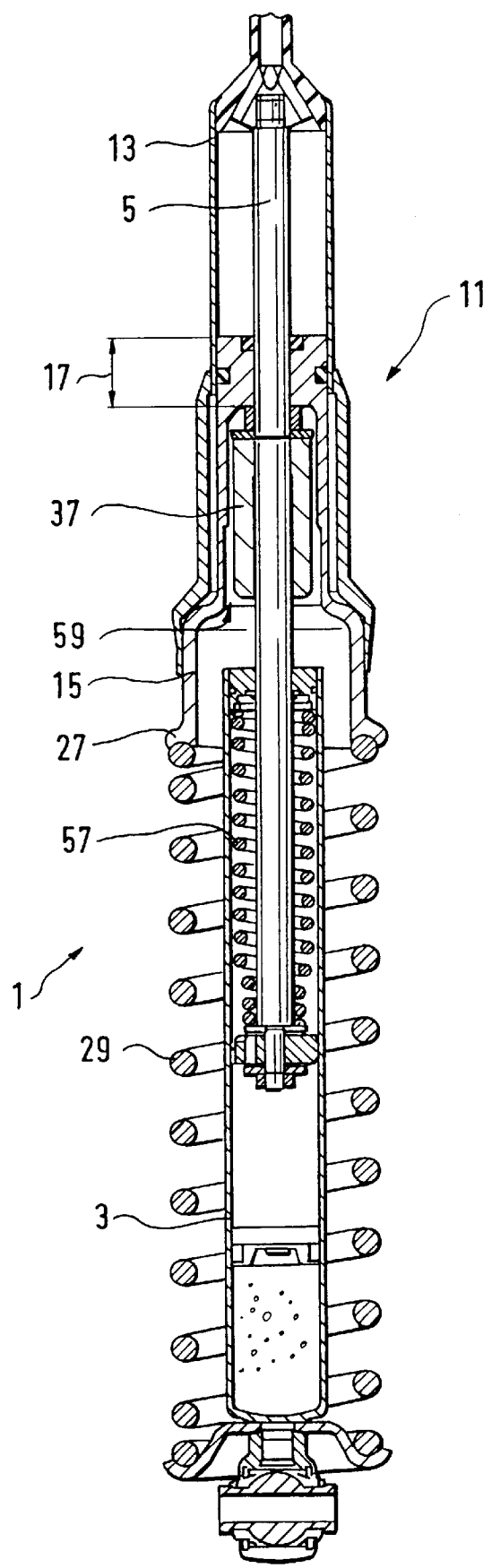
FIGS. 6 and 7 illustrate additional piston-cylinder units.

The embodiment illustrated in FIG. 6 can represent a piston-cylinder unit 1, the cylinder 3 of which is preferably a component of a vibration damper which has a decompression stop spring 57 like the one described in detail in DE 44 20 134, corresponding to U.S. Pat. No. 5,595,270 having Ser. No. 08/488,572 and filed Jun. 8, 1995. There are essential differences, in that as the level changes, and there preferably can be an accompanying level control action by means of the positioning cylinder 11, the application point of the decompression stop spring 57 can essentially be kept at the predetermined level. In contrast to previous variants, the second individual cylinder 15 can be realized in one piece with the first spring plate 27. The second individual cylinder 15 can thereby preferably be stepped or graduated in the direction of the cylinder 3, as a result of which steps or graduations a cavity 59 can be formed. The cavity 59 can be used for the compression stop 37.

As the level regulation occurs, the application point of the compression stop 37 preferably is not displaced. When relatively heavier loads are applied, the first individual cylinder 13 with the piston rod 5 can be extended farther outward as a result of the load, opposite to the additional deflection travel, by pumping pressure medium into the positioning cylinder 11. When a relatively heavy load is applied, the second individual cylinder 15 can move together with the first spring plate 27 toward the cylinder 3. The distance between the compression stop 37 and the end surface of the cylinder 3 can decrease by essentially an equal amount. In practical terms, the application point of the compression stop 37 can be displaced in relation to the deflection distance compared to the normal load, so that the compression stop 37 can be active earlier.

The realization or an embodiment of the positioning cylinder 11 can also have only one guide-seal unit 17. This guide-seal unit 17 can use the piston rod 5 as the guide path and simultaneously, with the outside diameter of the guide-seal unit 17, can use the inside diameter of the positioning cylinder 11 as a guide path. The guide-seal unit 17 can be machined to very exact or high tolerances by a metal-removing refinishing process. The area of the second individual cylinder 15 which can be adjacent to the guide-seal unit 17 preferably need not be in sealed contact over the entire length of second individual cylinder 15 with the inside diameter of the first individual cylinder 13.

Figure 7:
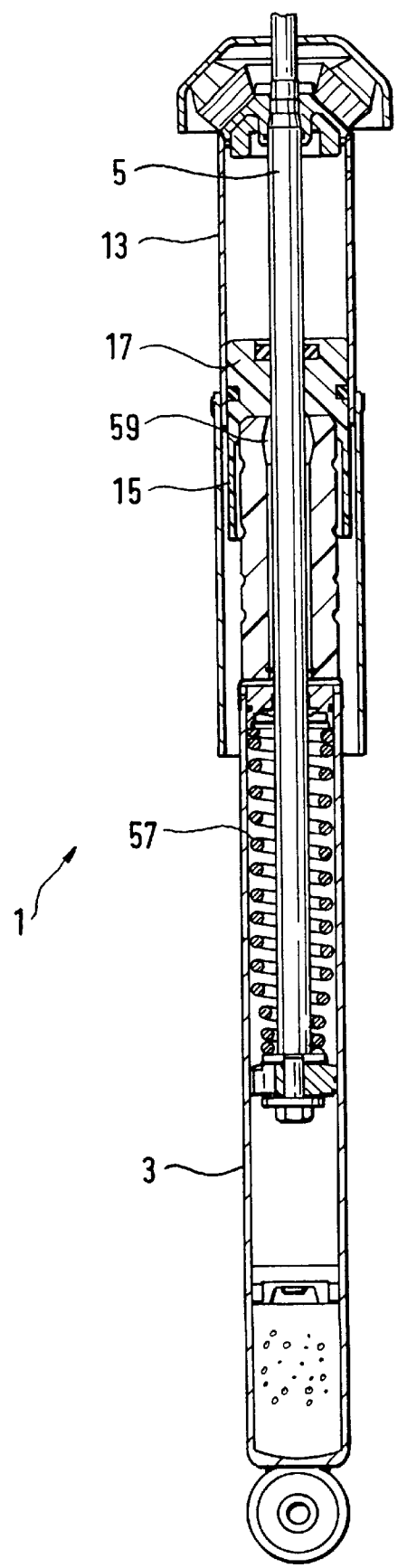

Of course, depending on the overall construction of the axle, a piston-cylinder unit 1 as illustrated in FIG. 7 can be used, in which the application point is not changed by a support spring (not shown), but for example the system pressure of an air spring is increased. In that case, the application point of the decompression stop limit spring 57 can be adjusted by means of the positioning cylinder 11 to meet the requirements.

One feature of the invention resides broadly in the piston-cylinder unit comprising a cylinder in which a piston rod is located so that the piston rod can move axially, a first connection mechanism which is effectively connected to the cylinder, a second connection mechanism which is connected to the piston rod, a positioning or adjustment or actuator cylinder with a pressure medium connection, whereby the positioning cylinder is effectively connected to one of the connection mechanisms and the distance between the first and second connection mechanisms is set by the addition or discharge of pressure medium, characterized by the fact that the positioning cylinder 11 is installed in series with the cylinder 3, whereby the piston rod 5 represents a guide path or track for the positioning cylinder.

Another feature of the invention resides broadly in the piston-cylinder unit characterized by the fact that the positioning cylinder is closed on the end by a guide-seal unit 17 in relation to the piston rod 5.

Yet another feature of the invention resides broadly in the piston-cylinder unit characterized by the fact that the positioning cylinder 11 consists of two individual cylinders 13; 15, which are located concentrically and move in a telescoping manner in relation to one another.

Still another feature of the invention resides broadly in the piston-cylinder unit characterize by the fact that between the two individual cylinders 13; 15 there is a second guide-seal unit 19, so that the outside diameter of the one individual cylinder represents a running path or track for the other individual cylinder.

A further feature of the invention resides broadly in the piston-cylinder unit characterized by the fact that on one of the individual cylinders, the positioning cylinder 11 has fastening means so that a first expansion bellows 23 can be installed between the first individual cylinder 13 and the second individual cylinder 15, which expansion bellows cover at least the stroke length of the first individual cylinder which projects out of the second individual cylinder.

Another feature of the invention resides broadly in the piston-cylinder unit characterized by the fact that an intermediate length 33 of the piston rod 5 between the cylinder 3 and the positioning cylinder 11 is covered by a second expansion bellows 35.

Yet another feature of the invention resides broadly in the piston-cylinder unit characterized by the fact that the fastening means are realized in the form of an encircling edge 25, by means of which there is a flow connection 45 between the spaces enclosed by the two expansion bellows 23; 35.

Still another feature of the invention resides broadly in the piston-cylinder unit characterized by the fact that the fastening means are realized in the form of a first spring plate 27, on which a support spring 29 is supported, which spring is biased opposite or on the opposite side by a second spring plate 21 which is effectively connected to the cylinder 3.

A further feature of the invention resides broadly in the piston-cylinder unit characterized by the fact that the second spring or expansion bellows 35 are clamped between the first and the second spring plates 37; 31.

Another feature of the invention resides broadly in the piston-cylinder unit characterized by the fact that the second spring plate 31 forms a ventilation opening 53 for the spaces enclosed by the expansion bellows 23; 35.

Yet another feature of the invention resides broadly in the piston-cylinder unit characterized by the fact that the first and second expansion bellows 23; 35 are fixed in position by the support spring 29 on the first spring plate 27.

Still another feature of the invention resides broadly in the piston-cylinder unit characterized by the fact that the first and the second expansion bellows 23; 35 are combined into one expansion bellows.

A further feature of the invention resides broadly in the piston-cylinder unit characterized by the fact that at least one of the expansion bellows 23; 35 is realized in the form of a compression stop.

Another feature of the invention resides broadly in the piston-cylinder unit characterized by the fact that the second expansion bellows 35, between its end points, has an effective connection to the piston rod 5, as a result of which the second expansion bellows 35 have two segments 35a; 35b, the length of which can be changed independently.

Yet another feature of the invention resides broadly in the piston-cylinder unit characterized by the fact that the second individual cylinder 15 is realized in a stepped fashion toward the cylinder 3, and a cavity 59 connected to it houses a compression stop 37.

Still another feature of the invention resides broadly in the piston-cylinder unit characterized by the fact that a decompression stop limit spring 57 is located in the cylinder 3.

Some examples of piston-cylinder units which could possibly be used or adapted for use in the context of the present invention, along with other components generally associated with piston-cylinder units could be disclosed by the following U.S. Patents, each of which are assigned to the assignee of the present invention: U.S. Pat. No. 5,598,905, U.S. Pat. No. 5,595,270, U.S. Pat. No. 5,575,360, U.S. Pat. No. 5,551,541, U.S. Pat. No. 5,524,871 and U.S. Pat. No. 5,547,050.

Other examples of piston-cylinder units, along with other components generally associated with piston-cylinder units and motor vehicle suspension systems could be disclosed by the following U.S. Patents: U.S. Pat. No. 5,590,898, U.S. Pat. No. 5,515,274, U.S. Pat. No. 5,461,564, U.S. Pat. No. 5,430,647, U.S. Pat. No. 5,401,053 and U.S. Pat. No. 5,322,321.

The components disclosed in the various publications, disclosed or incorporated by reference herein, may be used in the embodiments of the present invention, as well as, equivalents thereof.

All, or substantially all, of the components and methods of the various embodiments may be used with at least one embodiment or all of the embodiments, if more than one embodiment is described herein.

Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims. In the claims, means-plus-function clauses are intended to cover the structures described herein as performing the recited function and not only structural equivalents but also equivalent structures.

The invention as described hereinabove in the context of the preferred embodiments is not to be taken as limited to all of the provided details thereof, since modifications and variations thereof may be made without departing from the spirit and scope of the invention.

What is claimed is:

1. A vibration damper, said vibration damper having a longitudinal axis, said vibration damper comprising:
   a work cylinder containing damping medium;
   a piston rod sealingly projecting into said work cylinder;
   said piston rod being axially movable along the longitudinal axis with respect to said work cylinder;
   a piston being attached to said piston rod;
   said piston being slidably disposed in said work cylinder to sealingly divide said work cylinder into first and second work chambers;
   apparatus to attach said vibration damper to a first member;
   apparatus to attach said vibration damper to a second member;
   a fluid spring being operatively connected to one of said first member attaching apparatus and second member attaching apparatus;
   said fluid spring comprising a positioning actuator to regulate the distance between said first member attaching apparatus and said second member attaching apparatus;
   said positioning actuator being axially disposed away from said work cylinder along the longitudinal axis;
   said positioning actuator comprising a guided portion;
   said guided portion being axially movable with respect to said piston rod to regulate the distance between said first member attaching apparatus and said second member attaching apparatus;
   said piston rod comprising an outer surface;
   said outer surface of said piston rod being a guide surface to guide the axial displacement of said guided portion of said positioning actuator with respect to said piston rod;
   said guided portion of said positioning actuator comprising a first positioning cylinder;
   said positioning actuator comprising a second positioning cylinder; and
   one of: said first positioning cylinder and said second positioning cylinder extending into the other one of: said first positioning cylinder and said second positioning cylinder to permit axial telescoping of said first and second positioning cylinders with respect to one another along the longitudinal axis.

2. The vibration damper according to claim 1, wherein:
   said first positioning cylinder is disposed concentrically about said piston rod;
   said guided portion of said positioning actuator further comprises a sealing member to seal said fluid spring;
   said sealing member is sealingly disposed between said first positioning cylinder and said piston rod to seal said fluid spring; and
   said sealing member is slidingly disposed about said guide surface of said piston rod to be guided by said guide surface of said piston rod.

3. The vibration damper according to claim 2, wherein said vibration damper comprises one of the following A) and B):
   A) at least a portion of said first positioning cylinder is disposed in said second positioning cylinder;
   said first positioning cylinder comprises an outer surface;
   said outer surface of said first positioning cylinder comprises a second guide surface to guide the axial telescoping of said first and second positioning cylinders along the longitudinal axis; and
   B) at least a portion of said second positioning cylinder is disposed in said first positioning cylinder;
   said second positioning cylinder comprises an outer surface;
   said outer surface of said second positioning cylinder comprises a second guide surface to guide the axial telescoping of said first and second positioning cylinders along the longitudinal axis;
   said sealing member is a first sealing member;
   said first positioning cylinder comprises a second sealing member to seal said fluid spring;
   said second sealing member is sealingly disposed between said first positioning cylinder and said second positioning cylinder; and
   said second sealing member is slidingly disposed about said second guide surface to cooperate with said second guide surface and guide the axial telescoping of said first and second positioning cylinders.

4. A piston-cylinder unit having a longitudinal axis, said piston-cylinder unit comprising:
   a work cylinder containing damping medium;
   a piston rod being partially disposed in said work cylinder to sealingly divide said work cylinder into first and second work chambers;
   said piston rod being axially movable along the longitudinal axis with respect to said work cylinder;
   apparatus to attach said piston-cylinder unit to a first member;
   apparatus to attach said piston-cylinder unit to a second member;
   a fluid spring operatively connected to one of said first member attaching apparatus and said second member attaching apparatus;
   said fluid spring comprising a positioning actuator to regulate the distance between said first member attaching apparatus and said second member attaching apparatus;

said positioning actuator being axially disposed away from said work cylinder along the longitudinal axis;

a portion of said positioning actuator being axially movable with respect to said piston rod to regulate the distance between said first member attaching apparatus and said second member attaching apparatus;

said piston rod being disposed to guide the axial displacement of said portion of said positioning actuator with respect to said piston rod;

said positioning actuator comprising an inner telescoping cylinder and an outer telescoping cylinder;

said inner telescoping cylinder extending into said outer telescoping cylinder to permit telescoping displacement of said inner and outer telescoping cylinders with respect to one another along the longitudinal axis; and said portion of said positioning actuator movable with respect to said piston rod comprising one of said inner telescoping cylinder and said outer telescoping cylinder.

5. The piston-cylinder unit according to claim 4, wherein:

said inner telescoping cylinder comprises an outer surface;

the telescoping displacement of said inner and outer telescoping cylinders with respect to one another is guided by said outer surface of said inner telescoping cylinder.

6. The piston-cylinder unit according to claim 5, wherein:

said one of said inner telescoping cylinder and said outer telescoping cylinder comprises a positioning cylinder;

said positioning cylinder is disposed concentrically about said piston rod;

said positioning cylinder comprises a seal unit to seal said fluid spring;

said seal unit is slidingly disposed about said piston rod to be guided by said piston rod;

said piston-cylinder unit comprises one of the following A) and B):

A) said outer telescoping cylinder comprises said positioning cylinder;

said piston-cylinder unit comprises an additional seal unit to seal said fluid spring;

said additional seal unit is disposed between said inner and outer telescoping cylinders;

said additional seal unit is connected to said positioning cylinder to prevent relative axial displacement between said additional seal unit and said positioning cylinder; and said additional seal unit is disposed about said outer surface of said inner telescoping cylinder to cooperate with said outer surface of said inner telescoping cylinder in guiding the telescoping displacement of said inner and outer telescoping cylinders; and B) said inner telescoping cylinder comprises said positioning cylinder.

* * * * *

UNITED STATES PATENT AND TRADEMARK OFFICE
CERTIFICATE OF CORRECTION

PATENT NO. : 5,950,996
DATED : September 14, 1999
INVENTOR(S) : Joachim WIRTZ, Helmut LUNCZ and Peter FRITZ It is certified that error appears in the above-indentified patent and that said Letters Patent is hereby corrected as shown below:

On the title page, Item [75] after 'Inventor', delete "Robert Pradel, Heidenfield, Germany" and insert the following:

--Joachim Wirtz, Stuttgart, Germany
Helmut Luncz, Korntal, Germany
Peter Fritz, Sindelfingen, Germany--.

Signed and Sealed this

Sixth Day of February, 2001

Attest:

Attesting Officer

Q. TODD DICKINSON

Director of Patents and Trademarks